March 1, 1932.          J. T. WILKERSON          1,847,508
                           ANIMAL TRAP
                  Filed Nov. 26, 1930     4 Sheets-Sheet 1
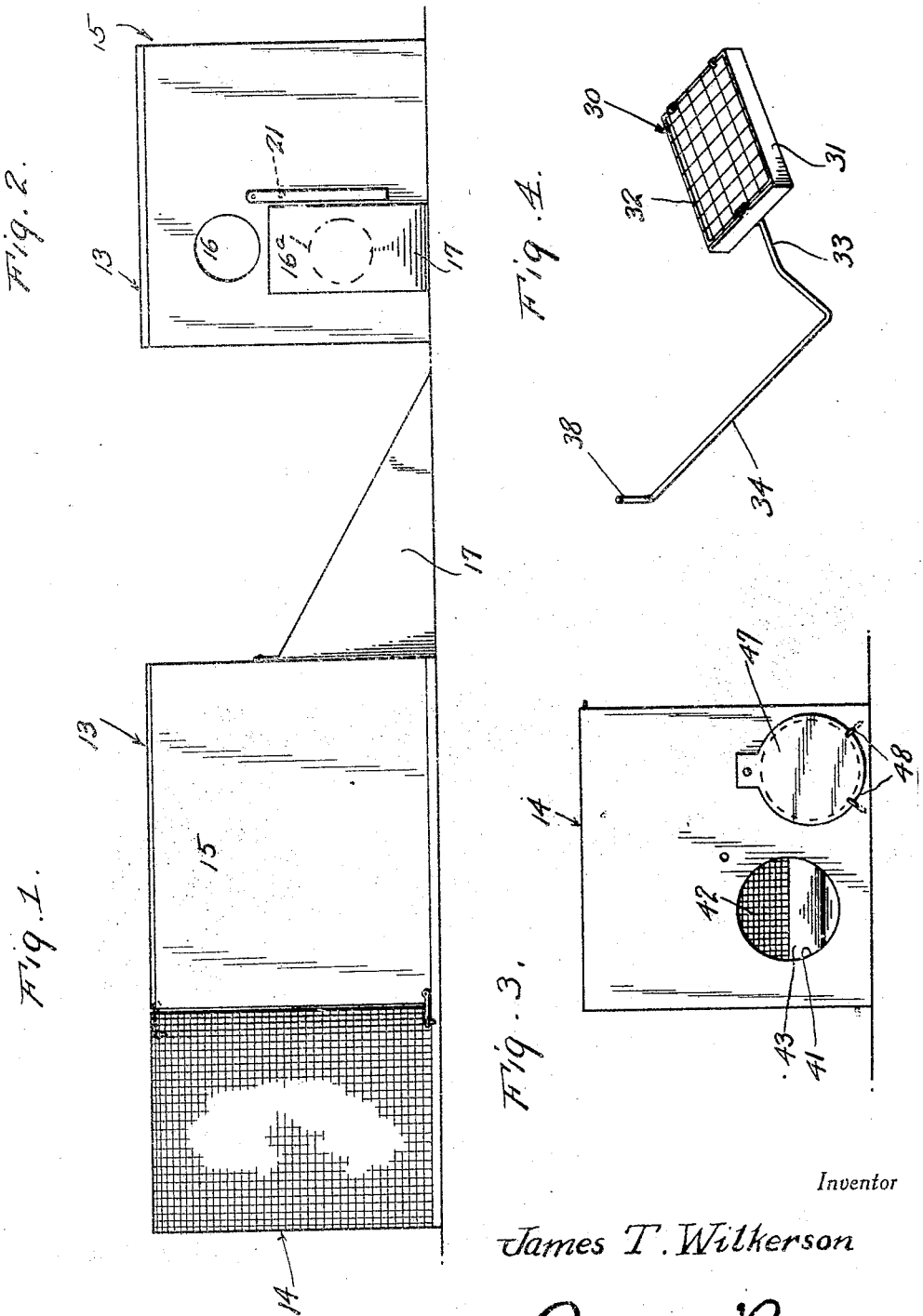
Inventor
James T. Wilkerson
By Clarence A. O'Brien
                Attorney

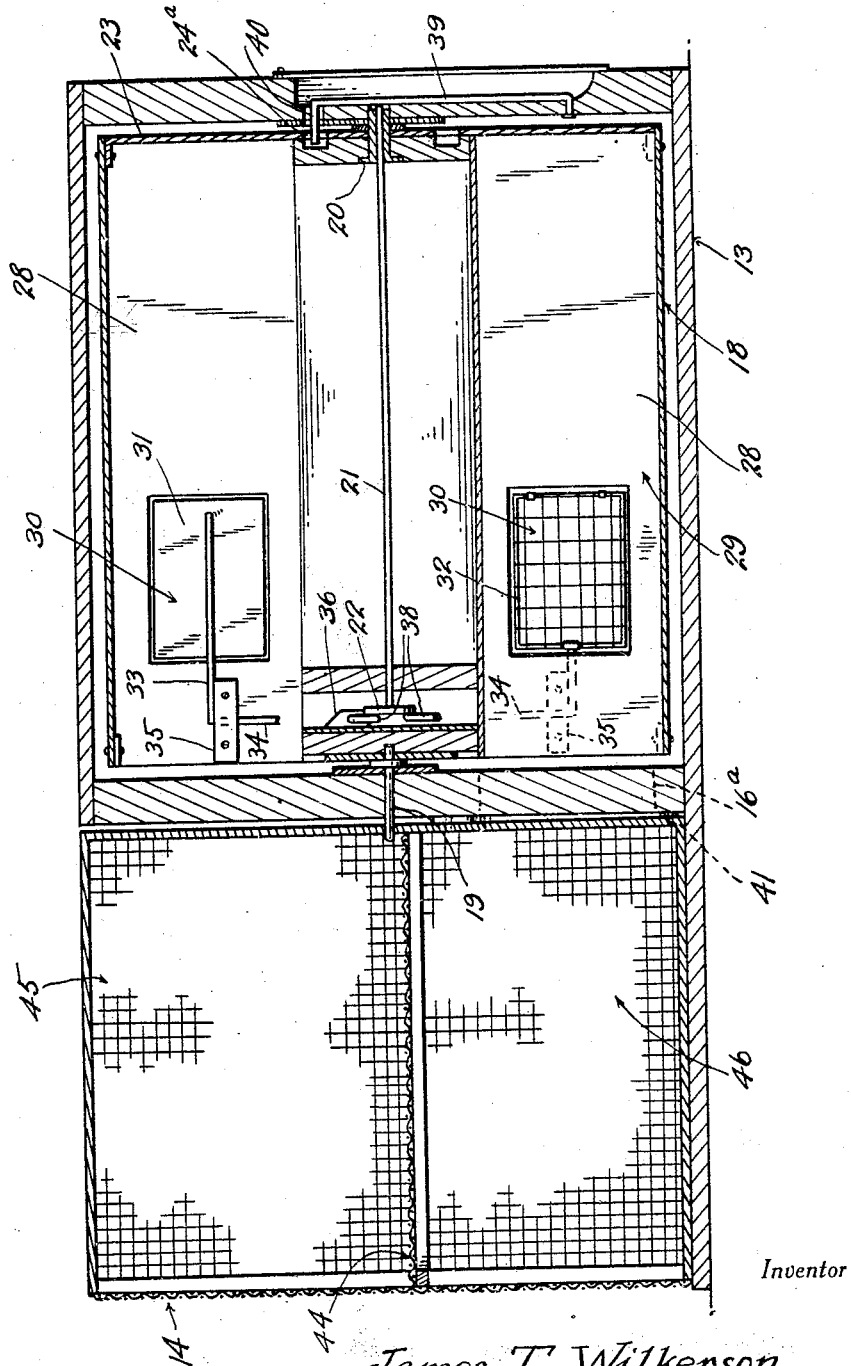

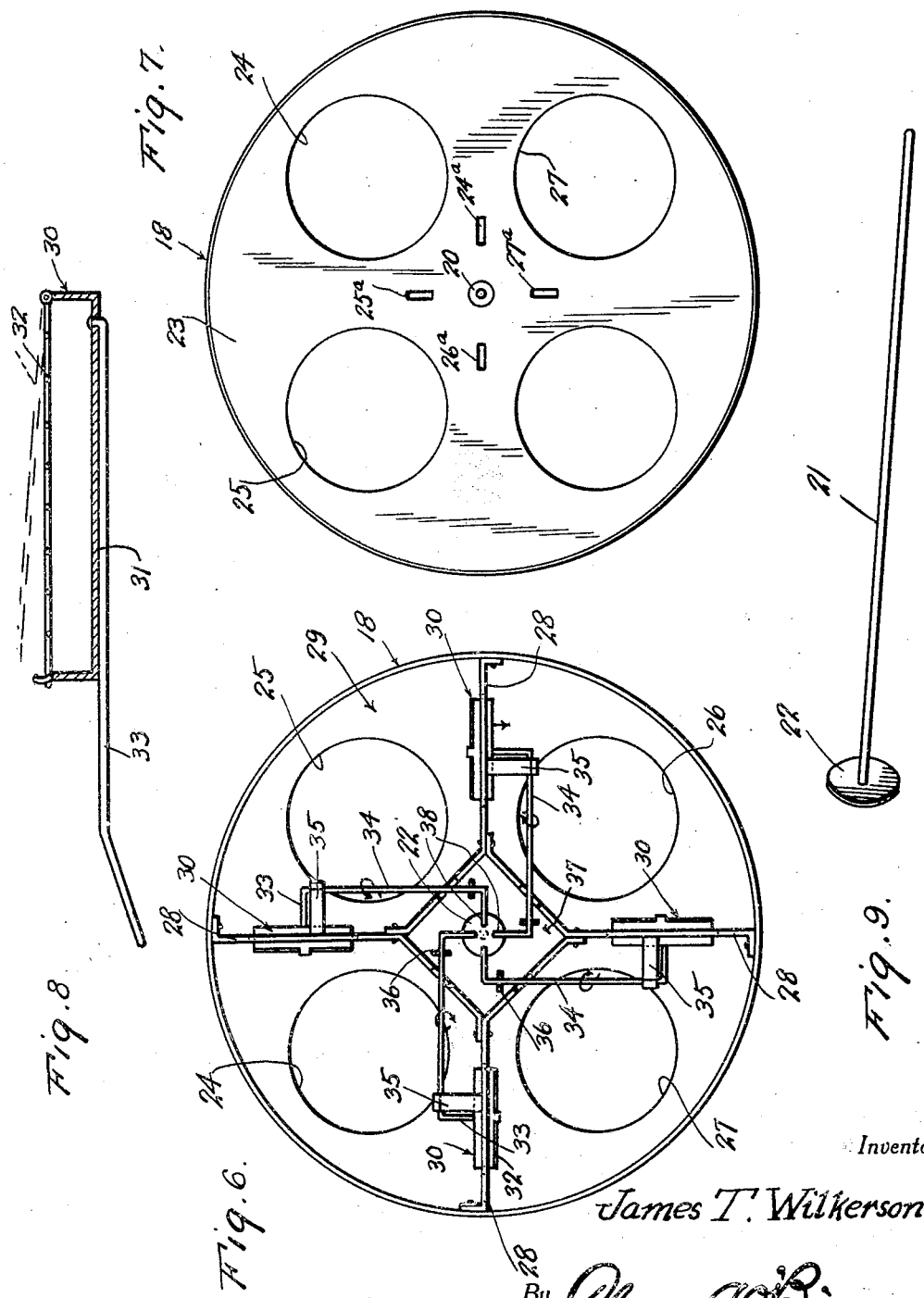

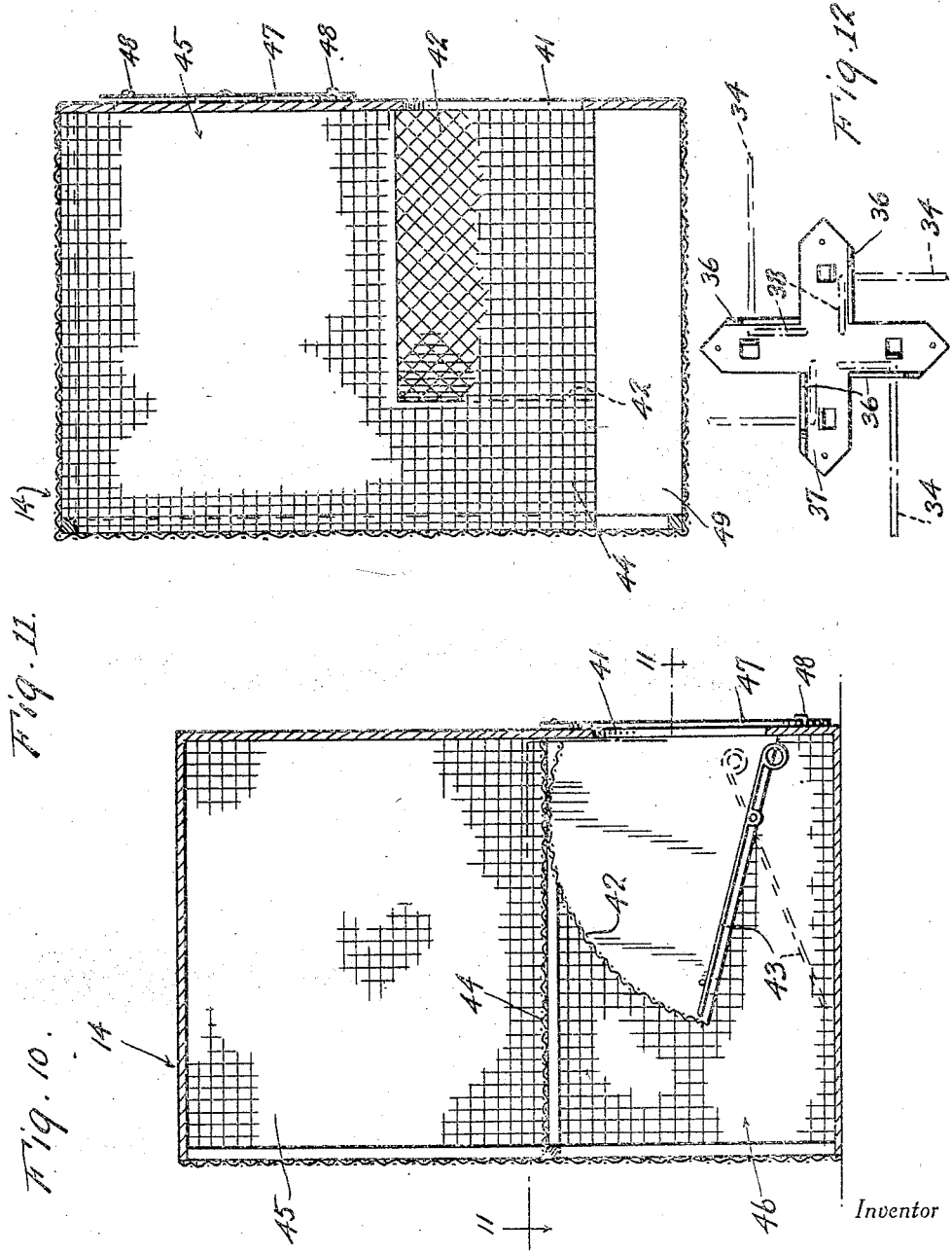

Patented Mar. 1, 1932

1,847,508

UNITED STATES PATENT OFFICE

JAMES T. WILKERSON, OF EXCEL, ALABAMA

ANIMAL TRAP

Application filed November 26, 1930. Serial No. 498,478.

This invention relates to an improved animal trap and has more particular reference to a structure of this classification which is especially, but not necessarily, adapted for catching rats.

Like other structures in the prior art, the invention embodies, broadly stated, a duplex assembly including the trap proper constituting the primary part, and a cage-like receiver, constituting a retention cage for the secondary part.

The trap is characteristic in that it embodies a housing containing a latch retained pocketed drum or cylinder wherein the pockets are brought into position for successively trapping the rats and placing them in a position to crawl into the retention cage.

Novelty is predicted upon the rotary drum feature which is unique in construction in that it embodies radial partitions forming the individual pockets, each partition having a trap door, and the trap door being formed with a grid covered bait receptacle.

Particular importance is attached to the trap door arrangement not so much because of the combination of the bait holding feature, but because of the fact that it is supported by a rock shaft arranged and constructed to actuate a push rod which in turn trips a latch for permitting the rotary drum to turn in a step-by-step manner.

In the drawings:

Figure 1 is a side elevational view of the complete assembly set up for use, the arrangement being strictly in accordance with the inventive conception involved in this application.

Figure 2 is an end view of the structure seen in Figure 1 observing it in a direction from right to left.

Figure 3 is an end view of the storage or retention cage.

Figure 4 is a perspective view of the compound bait receptacle and trap door.

Figure 5 is an enlarged longitudinal sectional view through the complete organization of parts showing the relationship.

Figure 6 is an inner end view of the rotary pocketed drum.

Figure 7 is an end view observing the opposite end that is, the outer end of the drum.

Figure 8 is a longitudinal detail section through the bait receptacle.

Figure 9 is perspective view of the longitudinally slidable push rod.

Figure 10 is a vertical section through the storage cage.

Figure 11 is a sectional view taken approximately upon the plane of the line 11—11 of Figure 10.

Figure 12 is a detail view of the cruciform and bearing plate for the multiple rock shaft assembly.

In Figure 1 of the drawings, the reference character 13 designates the trap or the primary part of the structure and 14 represents generally the storage cage in which the entrapped animals are retained for subsequent removal. Observing Figure 2, it will be seen that the trap 13 comprises a substantially rectangular housing 15 which is here shown in the nature of a box. In the front end thereof is an entrance hole 16 having an inclined runway 17 leading thereto to facilitate entrance of an animal.

As shown in Figure 5, there is a cylindrical drum 18 mounted for rotation in the housing. There is a journal pin 19 for the left hand end and a tubular journal 20 for the right hand end. The tubular journal has the additional function of a guide for a centrally disposed longitudinally reciprocatory push-rod 21. Incidentally the left hand end of this rod is formed with a thrust head 22. It will be noted that the closing plate 23 for the right hand end of the drum is formed as shown in Figure 7 with a group of four holes distinguished by the numerals 24, 25, 26 and 27.

Also, at this end, I provide radial slots 25a, 26a, 27a, and 24a. The slots 24a to 27a inclusive are adapted to be brought successively into registry with the inlet or entrance hole 16, as seen in Figure 2. In the interior of the drum, I provide radial partitions 28 which cooperate in forming a plurality of individual pockets, each pocket being generally designated by the reference character 29. Thus, there is an inlet hole for each pocket, and the pocket as well as the hole is brought into alinement with the entrance 16 in proper timed relationship.

The partitions 28 function as platforms as shown in Figure 5. Animal actuated tripping mechanism is provided in each platform and in the nature of a trap door generally designated by the numeral 30. As seen in Figures 4 and 8 each trap door comprises a box-like bait receptacle 31 and a hinged grid or screen 32. In addition, there is an arm 33 fastened to each receptacle provided with a laterally directed portion 34 providing a rock shaft which is journalled in bearings 35 and 36 respectively.

The bearings 36 are in the form of flanges bent laterally from the arm portions of the cruciform bearing plate 37. This is shown in detail in Figure 12. The extremities 38 of the rock shafts constitute trip fingers and these are located to press against the head 22 of the push rod 21 as exemplified in Figure 5. Thus each platform has its trap door and rock shaft together with means for successively actuating the push rod.

The right hand end of the push rod extends through the tubular journal 20 as seen in Figure 5, and this then functions as a bushing. Also the extremity of this push rod cooperates with the intermediate portion of a spring latch whose body portion is indicated by the numeral 39 and whose free end portion 40 is bent laterally to engage in one of the aforesaid keeper slots 24a to 27a inclusive.

The pockets of the drum as they drop down during the rotation of the drum, register with an inlet opening 41 in the cage. Arranged on the interior of the cage is an arcuate screen chute 42 and at the bottom of this is an animal actuated closure or treadle plate 43. This assumes the full line position shown in Figure 10 under normal circumstances, as it is permitted to drop, to permit an animal to enter the cage.

In the cage is a screen partition 44 so arranged as to form upper and lower chambers or compartments 45 and 46 respectively. The rats leave the cage through a hole which is provided with a pivoted cover plate 47 as seen in Figure 3. The numerals 48 merely designate retaining pins for these cover plates.

The operation of the trap is as follows: Each and every one of the bait receptacles are filled with appropriate bait and the grid lids then closed. It will be observed that the bait receptacle has the double function of holding the bait as well as providing the trapping mechanism. Normally the latch 40 is engaged with one of the keeper slots 24a to 27a as shown in Figure 5, so that one of the holes 24a to 27a is in registry with the entrance 16. Thus the trap is set.

It is arranged that an animal walks up the platform or incline 17, goes through hole 16 and into a pocket 29 of the drum. As it proceeds upon one of the platforms 28, under the attraction of the bait in the contiguous box it will walk upon the trap door, which will be moved by the weight of the animal to actuate the rock shaft and the finger 38 on the end of the rock shaft will thrust the push rod 21 longitudinally as is obvious in Figure 5 which will react on the latch 40 to disengage it from the keeper slot and permit the drum to turn one quarter turn under the weight of the animal therein. The then horizontal pocket will swing down to a vertical position bringing it into alinement with the cage and entrance 41. The animal will then go through the entrance and step upon the pivoted plate 43 and enter the lower compartment 46 of the cage.

Having been entrapped in the cage, the animal will probably attempt to seek escape through the space 49 (see Figure 11) between the partition 44 and the adjacent end wall and will thus enter the top compartment 45. In the meantime, the drum will have become automatically set for the next catch.

A careful consideration of the description in connection with the drawings will enable the reader to obtain a clear understanding of the construction, the features and advantages, and the operation. Therefore, a more lengthy description is regarded as unnecessary.

Minor changes in shape, size and rearrangement of details may be resorted to in actual practice if desired, so long as such changes do not depart from the scope of the adjoined claims.

I claim:

1. In a primary part of a duplex trap of the class described, a casing having an elevated entrance hole and a lower exit hole, a rotary drum mounted for rotation in said casing, partitions in said drum dividing it into individual pockets, latch means for holding said drum in a stationary position, and a push rod mounted in the drum for operating the latch means, a trap door in each pocket, said trap door being animal actuated, and means controlled by the trap door for actuating the push rod to release the latch means and to allow the drum to rotate to bring the respective pockets into alinement with the entrance and exit holes of said casing.

2. In a trap of the class described, a housing provided with an elevated entrance at one end, and a lowered exit at the opposite end, a rotary drum in said housing having inlet holes at one end, each of said holes adapted to be successively registered with said entrance, radial partitions in said drum dividing it into individual pockets, latch means for holding the drum in a stationary position and a push rod for actuating the latch means, an animal actuated trap door embodied in each partition, a rockshaft connected with each trap door, and each rock shaft being provided at its inner end with a trip finger for engaging said push rod to actuate said latch means.

3. In a trap of the class described, a housing provided with an elevated entrance at one end, and a lowered exit at the opposite end, a rotary drum in said housing having inlet holes at one end, each of said holes adapted to be successively registered with said entrance, radial partitions in said drum dividing it into individual pockets, latch means for holding the drum in a stationary position, and a push rod for actuating the latch means, an animal actuated trap door embodied in each partition, a rockshaft connected with each trap door, and each rock shaft being provided at its inner end with a trip finger for engaging said push rod to actuate said latch means, said trap door comprising a bait receptacle and a grid cover therefor.

In testimony whereof I affix my signature.

JAMES T. WILKERSON.